US008619993B2

(12) United States Patent
Verma (10) Patent No.: US 8,619,993 B2
(45) Date of Patent: Dec. 31, 2013

(54) CONTENT PROTECTION FOR OMA BROADCAST SMARTCARD PROFILES

(75) Inventor: Sanjeev Verma, San Diego, CA (US)

(73) Assignee: Nokia Corporation (FI)

( * ) Notice: Subject to any disclaimer, the term of this patent is extended or adjusted under 35 U.S.C. 154(b) by 1625 days.

(21) Appl. No.: 11/769,649

(22) Filed: Jun. 27, 2007

(65) Prior Publication Data
US 2008/0056498 A1   Mar. 6, 2008

Related U.S. Application Data (60) Provisional application No. 60/817,549, filed on Jun. 29, 2006.

(51) Int. Cl.
*H04L 29/06* (2006.01)
(52) U.S. Cl.
USPC ............ 380/278; 380/201; 380/281; 713/189
(58) Field of Classification Search
USPC .................................................. 380/201, 278
See application file for complete search history.

(56) References Cited

U.S. PATENT DOCUMENTS 5,517,567 A * 5/1996 Epstein .......................... 380/247
7,626,963 B2 * 12/2009 Patel et al. .................... 370/331
2002/0165825 A1 * 11/2002 Matsushima et al. ........... 705/51
2005/0210249 A1 *  9/2005 Lee et al. ....................... 713/168
2006/0280305 A1 * 12/2006 Bajko et al. ................... 380/270
2006/0291660 A1 * 12/2006 Gehrmann et al. ........... 380/277
2007/0041371 A1 *  2/2007 Hattori .......................... 370/352
2007/0143219 A1 *  6/2007 Shen et al. ..................... 705/52

* cited by examiner

*Primary Examiner* — Mohammad L Rahman
(74) *Attorney, Agent, or Firm* — Banner & Witcoff, Ltd.

(57) ABSTRACT

A system and method of providing content protection for OMA Broadcast smartcard profiles. When an electronic device has a content item for encryption, the device generates a random number. The electronic device then transmits a content encryption key request message, including the random number and a service encryption key identifier, to a smartcard, which then responds with a a content encryption key response message. The content encryption key response message includes the random number and a content encryption key. The electronic device can then use the content encryption key to manage the encryption of the content item. The electronic device stores random number, service key identifier and encrypted content item into a certain file format. The electronic device sends again content encryption key request at the time of rendering. The content encryption key returned by the content encryption key response message is used for the decryption of the stored content item.

19 Claims, 6 Drawing Sheets

CONTENT PROTECTION FOR OMA BROADCAST SMARTCARD PROFILES

FIELD OF THE INVENTION

The present invention relates generally to the content protection of digital content transmitted over a broadcast stream in an electronic device. More particularly, the present invention relates to systems for providing content protection in an electronic device to a broadcast stream delivered using smartcard-based key management

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The Open Mobile Alliance (OMA) Broadcast (BCAST) group has defined smartcard-based and digital rights management (DRM)-based profiles to address service and content protection issues in broadcast networks. In a conventional smartcard profile, the smartcard is trusted to store long-term secrets that are associated with a particular broadcast service. The device within which the smartcard is located is typically not trusted to generate and store a content encryption key required for content protection.

Figure 4:
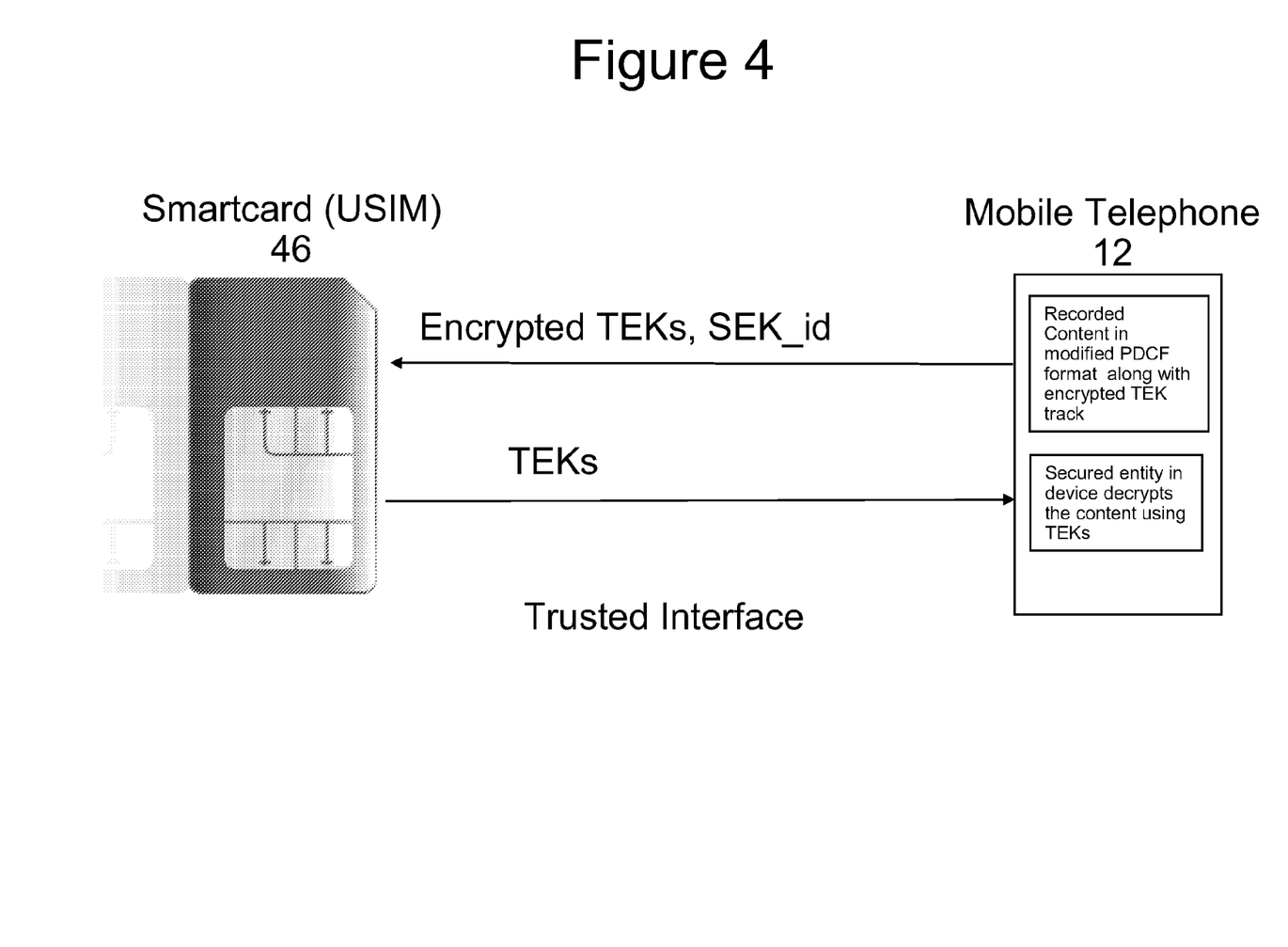
FIG. 4 is a representation showing the interaction between a mobile terminal and an associated smartcard during a conventional OMA BCAST content protection process.

The current OMA BCAST protection system only works with the ISMACryp-based service protection mechanism promulgated by the Internet Streaming Media Alliance. The current OMA BCAST specification provides content protection for an ISMACryp-protected stream with direct recording, meaning that an ISMACryp-protected stream can be recorded directly into a modified packetized DRM content format (PDCF) along with encrypted traffic keys (protected by a service key). This content protection process is depicted in FIG. 4, where a mobile terminal illustrated as a mobile telephone 12 or other electronic device interacts with a smartcard 46. As shown in FIG. 4, the mobile telephone 12 transmits encrypted traffic encryption keys (TEKs) and a service encryption key identifier (SEK_id) to the smartcard 46, and the smartcard returns TEKs to the mobile telephone 12. A secured entity in the mobile telephone 12 can then decrypt the content using the received TEKs. This system, unfortunately, does not work with the IP Security (Ipsec) and Secure Real-Time Transport Protocol (SRTP)-based protection systems.

In addition, the current OMA BCAST content protection system for smartcards unfortunately possesses a number of severe security problems. One such problem occurs in a "rental phone" scenario, where a first person rents a mobile telephone and subscribes to a broadcast service, which allows him to view recorded content, which is stored on the telephone. At some later point in time, the first person will remove the smartcard from the telephone and return the telephone to a rental company. However, the first person will occasionally forget to transfer or delete some of the recorded content from the telephone. At some later point in time, a second person may rent the same telephone, insert his own smartcard, and subscribe to the same broadcast service. As part of this subscription, the broadcast service will deliver a service key to the second person. In this situation, and assuming that the service key is still valid, the second person would be able to view the content that was purchased by the first person, even if the second person did not pay for that content.

Another problem area for the current OMA BCAST protection system involves the viewing of recorded content before a subscription is initiated. Currently, any device with an active broadcast interface can record broadcasted content in a PDCF format. Assuming that a broadcaster changes its SEK at the beginning of each month, a user can keep the broadcast interface in his telephone active and record content at will. However, if the user subscribes to the broadcast service near the end of a month and obtains the SEK from the service provider, he will be able to play all previously-recorded content that is located on the telephone, even though he is subscribing to the service for only a few days.

It would therefore be desirable to develop a system and method which addresses the shortcomings identified above.

SUMMARY OF THE INVENTION

The present invention provides a simple stateless solution for providing content protection to a broadcast stream delivered using smartcard-based key management. According to the present invention, a broadcast service provider indicates the need for content protection after the removal of service protection through a protection_after_reception flag in a short-term key message (STKM). The terminal needs to store the content in encrypted form if the protection_after_reception flag indicates so. According to the present invention, the terminal first removes the service protection by decrypting the delivered content and then temporarily stores the decrypted content if the protection_after_reception flag is set to TRUE. Otherwise, the terminal immediately renders/plays the content if the protection_after_reception flag is set to FALSE. If the protection_after_reception flag is set to TRUE, the terminal then checks whether the protection_after_reception flag in STKM indicates the need for content protection after the removal of service protection. If the answer is yes, then the terminal generates a random number (CEK_RAND) and sends a message (CEK_Request) to the smartcard, also known as the universal subscriber identity module (USIM). This message carries two parameters: CEK_RAND and SEK_id. The smartcard uses the SEK_id to retrieve the SEK and generate a content encryption key (CEK) using its key derivation function: CEK=KDF(IMSI, SEK, CEK_RAND), where CEK_RAND is a random number and, in one embodiment, the key derivation function (KDF) is the same as that used by Generic Bootstrapping Architecture (GBA) to generate a MBMS Request Key (MUK) and a MBMS User Key (MRK), as suggested in 3rd Generation Partnership Project (3GPP) documents TS 33.246 (Security of Multimedia Broadcast/Multicast Service (MBMS), version 6.5.0, Release 6, December 2005) and TS 33.220 (Generic bootstrapping architecture, version 6.3.0, Release 6, December 2004). The smartcard returns the CEK and the CEK_RAND over the trusted interface to the device through a CEK_Response message. The device then uses the CEK to encrypt the received content and packages encrypted content into a certain file format along with the CEK_RAND and the SEK_id. The content file is stored in a protected file format in the device. The decryption key for the protected file at the time of rendering can be obtained from the smartcard by following this procedure.

With the present invention, the content protection system is independent of the traffic protection system used by the underlying service protection mechanism. This is a substantial improvement over the current system, which only works with ISMACryp. Additionally, the content protection system of the present invention binds the CEK to both the service and the subscriber, while the existing system binds the content to only the service. This protects against the type of problems discussed previously. Furthermore, the content protection system of the present invention is simple to implement since the smartcard and device do not need to maintain any state; the CEK is calculated on the fly. The system of the present invention also consumes less time in decrypting at the time of rendering, as one CEK is used to decrypt the stored content. This can be achieved with as few as two messages. In contrast, the conventional system requires the device to store both STKM messages in a traffic encryption key (TEK) track along with the content. The number of messages required to decrypt the content with the current system is twice the number of traffic keys used to protect the protected content. This adversely impacts the viewing experience of the user. Lastly, the system of the present invention does not mandate many changes in the existing USIM implementation, as it reuses the existing functionalities of USIMs. The present invention can be incorporated into a wide variety of electronic devices which implement broadcast multimedia services.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
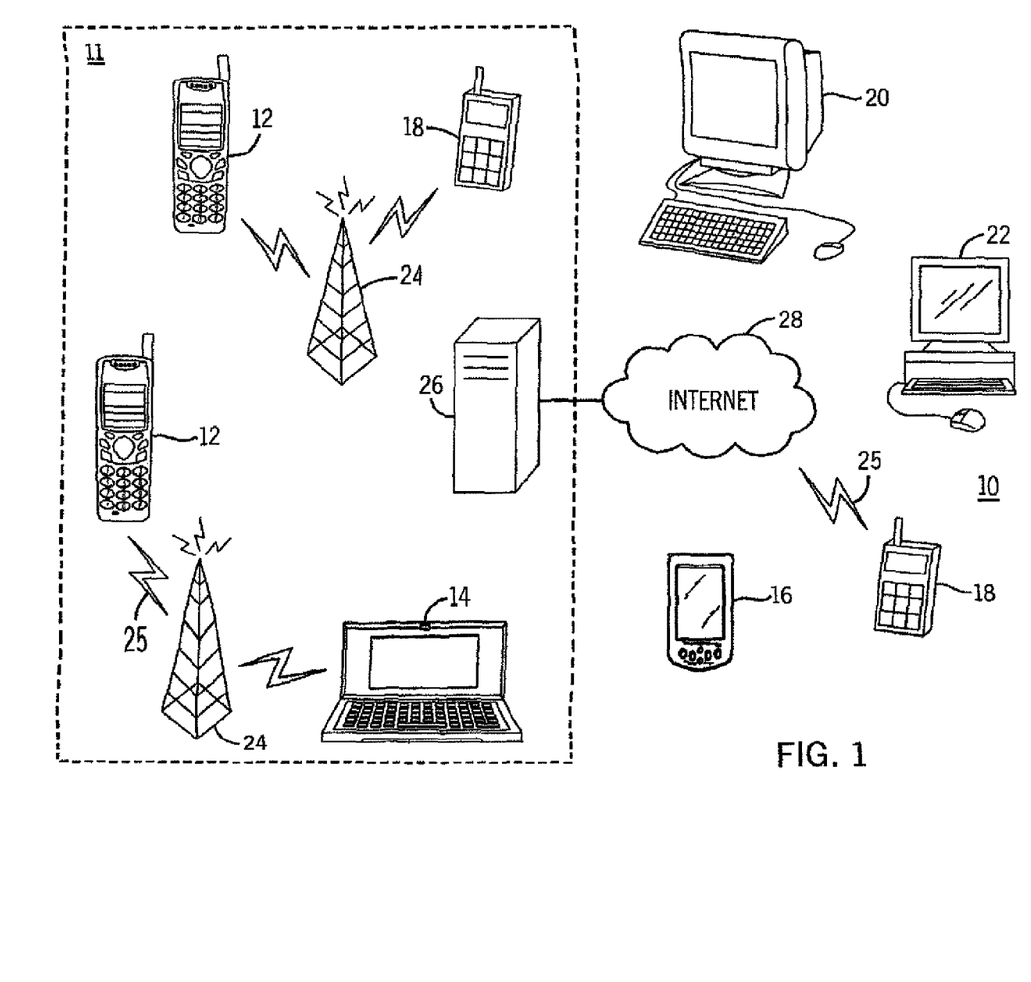
FIG. 1 is an overview diagram of a system within which the present invention may be implemented.

FIG. 1 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 1 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile telephone 12, a combination of a PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
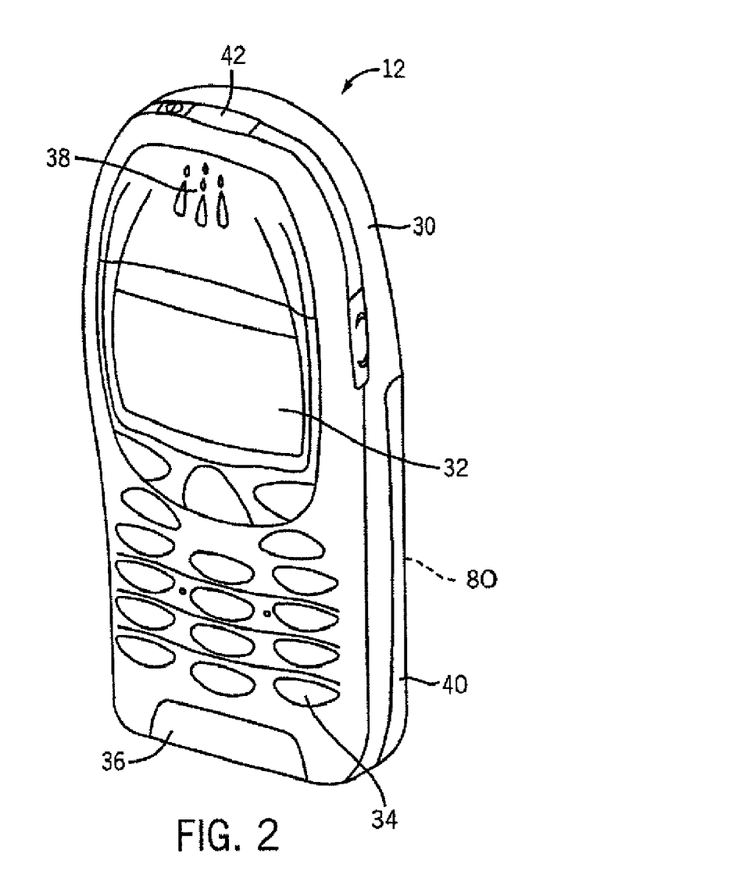
FIG. 2 is a perspective view of a mobile terminal that can be used in the implementation of the present invention.
Figure 3:
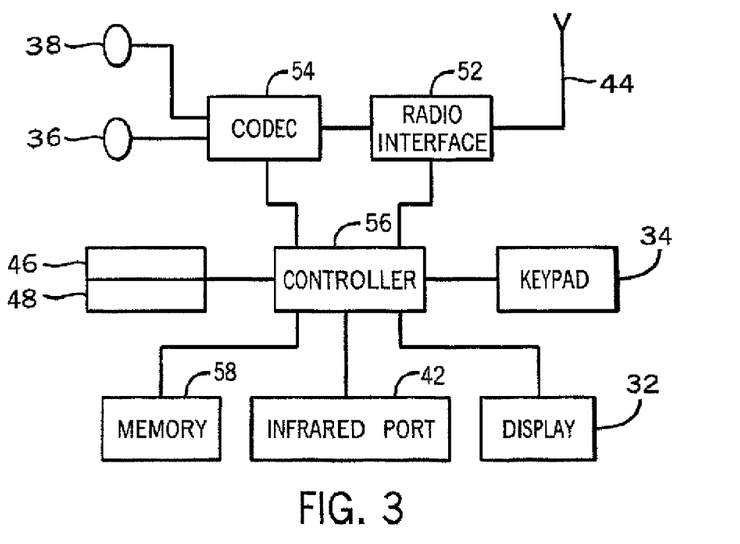
FIG. 3 is a schematic representation of the circuitry of the mobile terminal of FIG. 2.

FIGS. 2 and 3 show one representative mobile terminal illustrated as a mobile telephone 12 within which the present invention may be implemented. It should be understood, however, that the present invention is not intended to be limited to one particular type of mobile telephone 12 or other electronic device. Some or all of the components shown in FIGS. 2 and 3 could be incorporated into a wide variety of electronic devices incorporating one or more aspects of the present invention.

The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smartcard 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Figure 5:
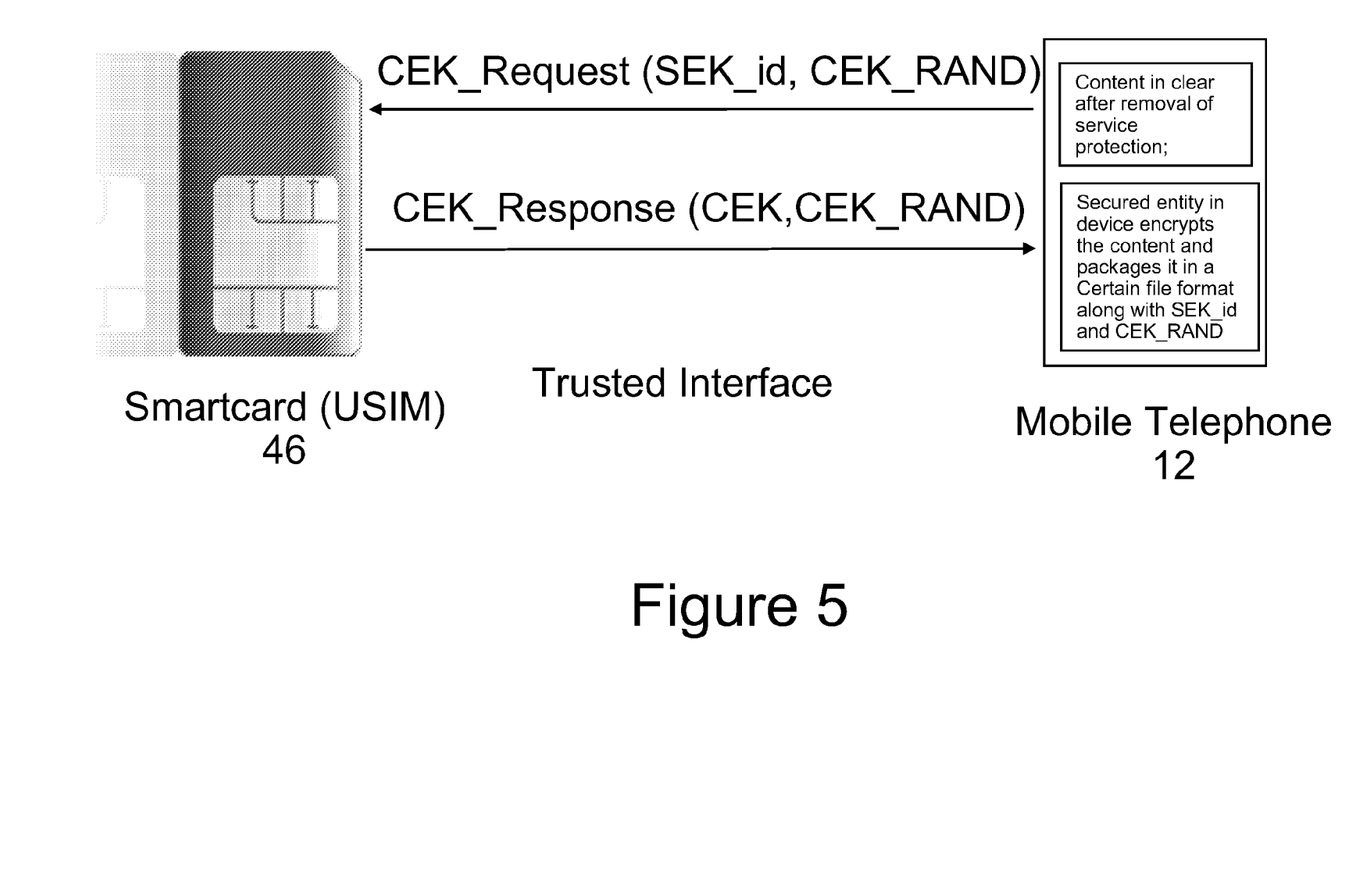
FIG. 5 is a representation showing the interaction between a mobile telephone and an associated smartcard during the implementation of various embodiments of the present invention.

The present invention provides a stateless solution for providing content protection to a broadcast stream delivered using smartcard-based key management. The content protection mechanism of the present invention involves the use of reencryption that is applicable to IPsec, SRTP and ISMACryp-protected broadcast streams. FIG. 5 is a representation of the interaction between the mobile telephone 12 (or other electronic device) and the associated smartcard 46 during the reencryption process. As shown in FIG. 5, once the mobile telephone 12 has received the content from a remote source, the service protection is removed by the mobile telephone 12. As a result, the content is temporarily clear of encryption. Subsequently, the mobile telephone 12 transmits a content encryption key request (CEK_Request) to the smartcard 46, which includes a CEK_RAND and a SEK_id. The CEK_RAND can be generated, for example, through the use of a random number generator. In response, the smartcard 46 transmits a content encryption key response (CEK_Response) back to the mobile telephone 12. The CEK_Response includes the CEK and the CEK_RAND. It should be noted that the CEK_Request and CEK_Response messages can both be defined as Multimedia Internet KEYing (MIKEY) messages. The mobile telephone 12 thereafter encrypts the content and packages the content in a specified file format along with a service encryption key identification (SEK_id) and the random number CEK_RAND. The CEK is stored in neither the smartcard 46 nor the mobile telephone 12. CEK is generated with a key derivation function having a number of parameters. The parameters include an identity of the subscriber, a service encryption key identified with the service encryption key identifier and the generated random number and thus equals KDF(IMSI, SEK, CEK_RAND). The IMSI, which is the international mobile subscriber identity for the electronic device at issue, cryptographically binds the CEK to the subscriber. The SEK cryptographically binds the CEK to the subscribed service. The CEK_RAND ensures different CEKs for contents delivered under the same SEK, as the mobile telephone 12 or other device generates this random number. In various embodiments, the key derivation function may use other parameters, in addition to or instead of the parameters mentioned above.

Figure 6:
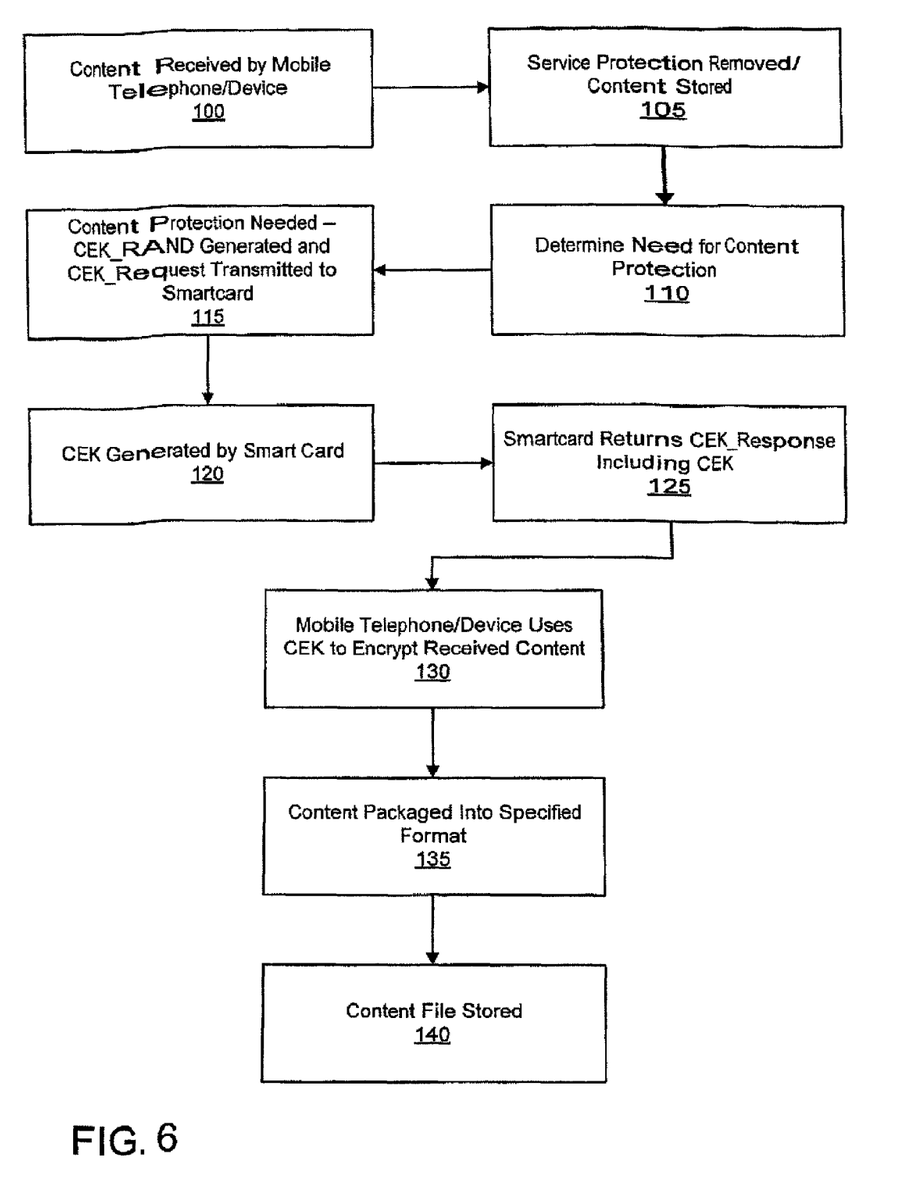
FIG. 6 is a flow chart showing the implementation of various embodiments of the present invention.

FIG. 6 is a flow chart showing the implementation of various embodiments of the present invention. It should be understood that, although this flow chart is discussed in terms of a mobile telephone 12, the process discussed herein is applicable to a wide variety of types of terminals. At 100 in FIG. 6, the mobile telephone 12 receives content from a service provider. At 105, the mobile telephone 12 removes the service protection from the content and temporarily stores the decrypted content "in clear." At 110, the mobile telephone 12 determines whether the protection_after_reception flag in an associated STKM message indicates the need for content protection after the service protection has been removed. If content protection after reception is needed, then at 115 the mobile telephone 12 generates a CEK_RAND and transmits a CEK_Request message to the smartcard 46. As discussed above, the CEK_Request includes the CEK_RAND and SEK_id parameters.

At 120, the smartcard 46 uses the SEK_id to retrieve the SEK and generate a CEK using its key derivation function: CEK=KDF(IMSI, SEK, CEK_RAND). In one embodiment, the KDF is the same as that used by GBA to generate MUK and MRK. At 125, the smartcard 46 returns the CEK_Response to the mobile telephone 12 over the trusted interface, with the CEK_Response message including the CEK and CEK_RAND.

At 130, the mobile telephone 12 uses the CEK to encrypt the received content. At 135, the content is packaged into a certain file format along with the CEK_RAND and the SEK_id. At 140, the content file is stored in the mobile telephone 12 in a protected file format.

At a later time, when the content at issue is to be rendered, the same process discussed above is used by the mobile telephone 12 to obtain the CEK for the protected file, with the CEK being used to decrypt the file instead of to encrypt it. At no time is the CEK stored by either the mobile telephone 12 or the smartcard 46.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:
   decrypting a content item to produce decrypted content;
   generating, at a computing device, a random number;
   generating a content encryption key request message including the random number and a service encryption key identifier;
   transmitting the content encryption key request message from the computing device to a smartcard coupled to a processor of the computing device to cause the smartcard to respond with a content encryption key that is generated with a key derivation function having as parameters an identification of a subscriber, a service encryption key identified with the service encryption key identifier and the random number, wherein the key derivation function is usable in general bootstrapping architecture, and wherein the identification of the subscriber includes an international mobile subscriber identity assigned to the subscriber;
   receiving a content encryption key response message from the smartcard coupled to the processor of the computing device, the content encryption key response message including the random number and the content encryption key; and
   encrypting the decrypted content using the content encryption key.

2. The method of claim 1, wherein encrypting the decrypted content produces encrypted content, and the method further comprises:
   storing the encrypted content in a file format.

3. The method of claim 1, wherein encrypting the decrypted content produces encrypted content, and the method further comprises:
   transmitting a second content encryption key request message from the computing device to the smartcard, the second content encryption key request message including a random number parameter and a service encryption key identifier parameter;
   receiving a second content encryption key response message from the smartcard, the second content encryption key response message including a second content encryption key that is the same as the content encryption key; and decrypting the encrypted content using the second content encryption key.

4. The method of claim 1, further comprising:
   subsequent to decrypting the content item, determining that content protection is needed for the content item; and
   upon determining that content protection is needed for the content item, performing both of the generating steps and the transmitting step of the method.

5. The method of claim 4, wherein determining that content protection is needed for the content item includes analyzing a protection flag associated with the content item.

6. The method of claim 1, wherein encrypting the decrypted content produces encrypted content and the method further comprises:
   storing the encrypted content and not storing the content encryption key.

7. A non-transitory computer-readable medium storing computer executable instructions configured to, when executed, cause a processor to:
   decrypt a content item to produce decrypted content;
   generate a random number;
   generate a content encryption key request message including the random number and a service encryption key identifier;
   transmit the content encryption key request message to a smartcard when the processor is coupled to the smartcard to cause the smartcard to respond with a content encryption key that is generated with a key derivation function having as parameters an identification of a subscriber, a service encryption key identified with the service encryption key identifier and the random number, wherein the key derivation function is usable in general bootstrapping architecture, and wherein the identification of the subscriber includes an international mobile subscriber identity assigned to the subscriber;
   receive a content encryption key response message from the smartcard coupled to the processor, the content encryption key response message including the random number and the content encryption key; and
   encrypt the decrypted content using the content encryption key.

8. An apparatus, comprising:
   a processor; and
   a memory storing computer executable instructions configured to, when executed, cause the apparatus to:
   decrypt a content item to produce decrypted content;
   generate a random number;
   generate a content encryption key request message including the random number and a service encryption key identifier;
   transmit the content encryption key request message to a smartcard coupled to the processor to cause the smartcard to respond with a content encryption key that is generated with a key derivation function having as parameters an identification of a subscriber, a service encryption key identified with the service encryption key identifier and the random number, wherein the key derivation function is usable in general bootstrapping architecture, and wherein the identification of the subscriber includes an international mobile subscriber identity assigned to the subscriber; and
   receive a content encryption key response message from the smartcard coupled to the processor, the content encryption key response message including the random number and the content encryption key; and
   encrypt the decrypted content using the content encryption key.

9. The apparatus of claim 8, wherein encrypting the decrypted content produces encrypted content, and the memory further stores computer executable instructions configured to, when executed, cause the apparatus to:
   store the encrypted content in a file format.

10. The apparatus of claim 8, wherein encrypting the decrypted content produces encrypted content and the memory further stores computer executable instructions configured to, when executed, cause the apparatus to:
    transmit a second content encryption key request message to the smartcard, the second content encryption key request message including a random number parameter and a service encryption key identifier parameter;
    receive a second content encryption key response message from the smartcard, the second content encryption key response message including a second content encryption key that is the same as the content encryption key; and
    decrypt the encrypted content using the second content encryption key.

11. The apparatus of claim 8, wherein the memory further stores computer executable instructions configured to, when executed, cause the apparatus to:
    subsequent to decrypting the content item, determine that content protection is needed for the content item; and
    upon determining that content protection is needed for the content item, perform both of the generating steps and the transmitting step of claim 8.

12. The apparatus of claim 11, wherein determining that content protection is needed for the content item includes analyzing a protection flag associated with the content item.

13. The apparatus of claim 8, wherein encrypting the decrypted content produces encrypted content and the memory further stores computer executable instructions configured to, when executed, cause the apparatus to:
    store the encrypted content and not store the content encryption key.

14. A method, comprising:
    receiving, at a module including a memory, a content encryption key request message from a computing device, the content encryption key request message including a random number and a service encryption key identifier, wherein the module is coupled to a processor of the computing device;
    in response to receipt of the content encryption key request message, generating a content encryption key at the module with a key derivation function having as parameters an identification of a subscriber, a service encryption key identified with the service encryption key identifier and the random number, wherein the key derivation function is usable in general bootstrapping architecture, and wherein the identification of the subscriber includes an international mobile subscriber identity assigned to the subscriber;
    transmitting a content encryption key response message from the module to the computing device, the content encryption response message including the content encryption key and the random number;
    receiving, at the module coupled to the processor of the computing device, one or more additional content encryption key request messages, each of the one or more additional content encryption key request messages including the random number and the service encryption key identifier; and in response to receiving each of the one or more additional content encryption key request messages, regenerating the content encryption key at the module based on the random number and the service encryption key identifier.

15. A non-transitory computer-readable medium storing computer executable instructions configured to, when executed, cause an apparatus to:
receive a content encryption key request message from a computing device, the content encryption key request message including a random number generated by the computing device and a service encryption key identifier, wherein the apparatus is coupled to a processor of the computing device;
in response to receipt of the content encryption key request message, generate a content encryption key with a key derivation function having as parameters an identification of a subscriber, a service encryption key identified with the service encryption key identifier and the random number, wherein the key derivation function is usable in general bootstrapping architecture, and wherein the identification of the subscriber includes an international mobile subscriber identity assigned to the subscriber;
transmit a content encryption key response message to the computing device, the content encryption response message including the content encryption key and the random number;
receive one or more additional content encryption key request messages from the computing device, each of the one or more additional content encryption key request messages including the random number and the service encryption key identifier; and
in response to receiving each of the one or more additional content encryption key request messages, regenerating the content encryption key based on the random number and the service encryption key identifier.

16. The method of claim 1, further comprising:
selecting between protecting the decrypted content and beginning playback of the decrypted content, wherein generating the random number, generating the content encryption key request message, and transmitting the content encryption key request message are performed in response to selecting to protect the decrypted content.

17. An apparatus, comprising:
a processor; and
a memory storing computer executable instructions that, when executed, cause the apparatus to:
receive a content encryption key request message from a computing device, the content encryption key request message including a random number generated by the computing device and a service encryption key identifier, wherein the apparatus is coupled to a processor of the computing device;
in response to receipt of the content encryption key request message, generate a content encryption key with a key derivation function having as parameters an identification of a subscriber, a service encryption key identified with the service encryption key identifier and the random number, wherein the key derivation function is usable in general bootstrapping architecture, and wherein the identification of the subscriber includes an international mobile subscriber identity assigned to the subscriber;
transmit a content encryption key response message to the computing device, the content encryption response message including the content encryption key and the random number;
receive one or more additional content encryption key request messages from the computing device, each of the one or more additional content encryption key request messages including the random number and the service encryption key identifier; and
in response to receiving each of the one or more additional content encryption key request messages, regenerate the content encryption key based on the random number and the service encryption key identifier.

18. The method of claim 3, further comprising:
storing the random number, and the service encryption key identifier, resulting in a stored random number and a stored service encryption key identifier; and
retrieving the stored random number and the stored service encryption key identifier, resulting in a retrieved random number and a retrieved service encryption key identifier;
wherein the retrieved random number is the random number parameter of the second content encryption key request message and the retrieved service encryption key identifier is the service encryption key identifier of the second content encryption key request message.

19. The method of claim 1, wherein encrypting the decrypted content produces encrypted content, and the method further comprises:
obtaining a content encryption key for decrypting the encrypted content from the smartcard using another content encryption key request message.

\* \* \* \* \*